| (12) United States Patent | (10) Patent No.: US 9,191,564 B2 |
| Li et al. | (45) Date of Patent: Nov. 17, 2015 |

(54) METHOD FOR DETERMINING THE NUMBER OF AVAILABLE SHOTS AND IMAGE-SHOOTING APPARATUS

(71) Applicant: Huawei Device Co., Ltd., Shenzhen (CN)

(72) Inventors: Tie Li, Shanghai (CN); Rongqiu Lin, Shenzhen (CN); Guodong Chen, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/142,264

(22) Filed: Dec. 27, 2013

(65) Prior Publication Data

US 2014/0132798 A1 May 15, 2014

Related U.S. Application Data

(63) Continuation of application No. PCT/CN2013/076983, filed on Jun. 8, 2013.

(30) Foreign Application Priority Data

Jun. 8, 2012 (CN) .......................... 2012 1 0188802

(51) Int. Cl.
  *H04N 5/76* (2006.01)
  *H04N 5/232* (2006.01)
  *H04N 1/21* (2006.01)
  *H04N 5/77* (2006.01)
  *H04N 101/00* (2006.01)

(52) U.S. Cl.
  CPC ............. *H04N 5/232* (2013.01); *H04N 1/2112* (2013.01); *H04N 1/2116* (2013.01); *H04N 5/23245* (2013.01); *H04N 5/772* (2013.01); *H04N 2101/00* (2013.01); *H04N 2201/212* (2013.01); *H04N 2201/214* (2013.01)

(58) Field of Classification Search
  USPC ....................................................... 348/231.2
  See application file for complete search history.

(56) References Cited

U.S. PATENT DOCUMENTS 7,268,810 B2 * 9/2007 Yoshida ..................... 348/240.2
7,768,558 B1 8/2010 Schinner et al.
(Continued)

FOREIGN PATENT DOCUMENTS

CN 1420454 A 5/2003
CN 1551614 A 12/2004
(Continued)

*Primary Examiner* — Ngoc-Yen Vu
(74) *Attorney, Agent, or Firm* — Leydig, Voit & Mayer, Ltd.

(57) ABSTRACT

Embodiments of the present invention provide a method for determining the number of available shots and an image-shooting apparatus. The method includes: determining a current shooting mode; acquiring an average value of a picture size before current shooting in the current shooting mode, where the average value of the picture size is calculated according to storage space occupied by pictures shot before the current shooting in the current shooting mode and the number of the pictures shot before the current shooting in the current shooting mode; and determining, according to currently available storage space and the average value of the picture size, the number of available shots before the current shooting. The technical solution of the present invention improves precision of the determined number of available shots.

12 Claims, 3 Drawing Sheets

(56) References Cited

U.S. PATENT DOCUMENTS

| | | | |
|---|---|---|---|
| 8,456,535 B2 * | 6/2013 | Shinomiya | 348/211.9 |
| 2001/0048472 A1 | 12/2001 | Inoue et al. | |
| 2003/0095195 A1 | 5/2003 | Iwauchi | |
| 2004/0051785 A1 * | 3/2004 | Yokonuma et al. | 348/207.99 |
| 2004/0227825 A1 | 11/2004 | Sakimura et al. | |
| 2005/0151858 A1 * | 7/2005 | Nozaki et al. | 348/231.9 |
| 2006/0290804 A1 | 12/2006 | Mino et al. | |
| 2007/0147769 A1 | 6/2007 | Nagaoka et al. | |
| 2008/0064377 A1 * | 3/2008 | Mori | 455/414.1 |
| 2008/0151076 A1 * | 6/2008 | Takane | 348/231.99 |

FOREIGN PATENT DOCUMENTS

| | | |
|---|---|---|
| CN | 1780352 A | 5/2006 |
| CN | 1941846 A | 4/2007 |
| CN | 102724403 A | 10/2012 |
| JP | 2004096623 A | 3/2004 |
| JP | 2007180834 A | 7/2007 |
| JP | 2008244940 A | 10/2008 |
| WO | WO 2006061983 A1 | 6/2006 |

* cited by examiner

METHOD FOR DETERMINING THE NUMBER OF AVAILABLE SHOTS AND IMAGE-SHOOTING APPARATUS

CROSS-REFERENCE TO RELATED APPLICATIONS

This application is a continuation of International Patent Application No. PCT/CN2013/076983, filed on Jun. 8, 2013, which claims priority to Chinese Patent Application No. 201210188802.0, filed on Jun. 8, 2012, both of which are incorporated herein by reference in their entireties.

TECHNICAL FIELD

The present invention relates to the field of image technologies, and in particular, to a method for determining the number of available shots and an image-shooting apparatus.

BACKGROUND

Displaying the number of available shots (that is, the number of remaining shots) is a technology often employed in an image-shooting apparatus, and this technology is used to display to a user how many pictures can still be taken when shooting. Currently, the method for determining the number of available shots generally includes: acquiring the size of remaining storage space M of the image-shooting apparatus, acquiring a size of space P required by each picture in a current scenario, and calculating an estimated value of the number of available shots N=M/P. The size of the space P required by each picture may be affected by many factors, such as resolution, compression ratio, and effect, that is to say, the size of the space P required by each picture varies in different shooting modes. Therefore, how to acquire the size of the space P required by each picture in different shooting modes becomes a difficult problem for determining the number of available shots currently.

In the prior art, to solve the problem for acquiring the size of the space P required by each picture, the size of the space P required by each picture is pre-estimated according to image parameters set in each shooting mode, correspondence between the shooting mode and the size of the space P required by each picture in the shooting mode is preset in the image-shooting apparatus, and the preset size of the space P required by each picture is used in calculating the number of available shots each time; however, an actual size of each shot picture may not be the same as P, so an error may exist in the calculated number of available shots, and precision is not high.

SUMMARY

The present invention provides a method for determining the number of available shots and an image-shooting apparatus, to improve precision of the determined number of available shots.

In one aspect, a method for determining the number of available shots is provided and includes:

determining a current shooting mode;

acquiring an average value of a picture size before current shooting in the current shooting mode, where the average value of the picture size before the current shooting in the current shooting mode is calculated according to storage space occupied by pictures shot before the current shooting in the current shooting mode and the number of the pictures shot before the current shooting in the current shooting mode; and determining, according to currently available storage space and the average value of the picture size before the current shooting in the current shooting mode, the number of available shots before the current shooting in the current shooting mode.

In another aspect, an image-shooting apparatus is provided and includes:

a mode determining module, configured to determine a current shooting mode;

an acquiring module, configured to acquire an average value of a picture size before current shooting in the current shooting mode, where the average value of the picture size before the current shooting in the current shooting mode is calculated according to storage space occupied by pictures shot before the current shooting in the current shooting mode and the number of the pictures shot before the current shooting in the current shooting mode; and a picture number determining module, configured to determine, according to currently available storage space and the average value of the picture size before the current shooting in the current shooting mode, the number of available shots before the current shooting in the current shooting mode.

In the method for determining the number of available shots provided in one aspect, a current shooting mode is determined, after the current shooting mode is determined, an average value of a picture size in the current shooting mode is acquired, and the number of available shots is determined according to currently available storage space and the average value of the picture size, where the average value of the picture size is calculated according to storage space occupied by pictures shot in the current shooting mode and the number of the pictures shot in the current shooting mode, and varies with a change in the number of the shot pictures; therefore, the method provided by the present invention determines the number of available shots by using the average value of the picture size calculated according to the storage space occupied by the pictures shot in the current shooting mode and the number of the pictures shot in the current shooting mode, instead of using a pre-estimated and preset size of space required by each picture, which improves precision of the determined number of available shots.

In the image-shooting apparatus provided in the other aspect, a current shooting mode is determined, after the current shooting mode is determined, an average value of a picture size in the current shooting mode is acquired, and the number of available shots is determined according to currently available storage space and the average value of the picture size, where the average value of the picture size is calculated according to storage space occupied by pictures shot in the current shooting mode and the number of the pictures shot in the current shooting mode, and varies with a change in the number of the shot pictures; therefore, the image-shooting apparatus provided by the present invention determines the number of available shots by using the average value of the picture size calculated in real time according to the storage space occupied by the pictures shot in the current shooting mode and the number of the pictures shot in the current shooting mode, instead of using a pre-estimated and preset size of space required by each picture, which improves precision of the determined number of available shots.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
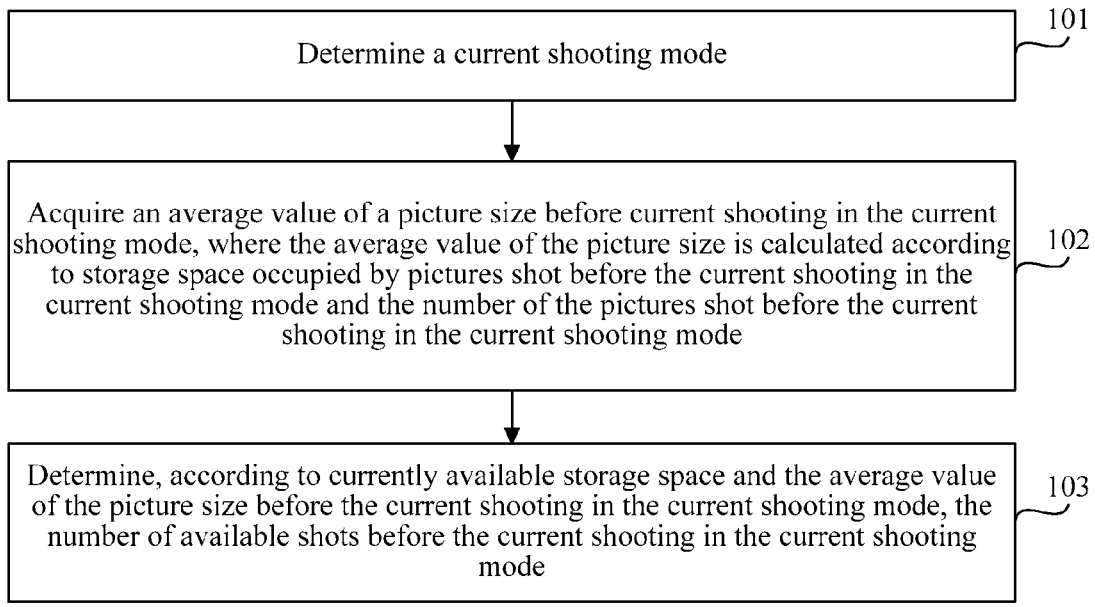
FIG. 1 is a flowchart of a method for determining the number of available shots provided by an embodiment of the present invention.

FIG. 1 is a flowchart of a method for determining the number of available shots provided by an embodiment of the present invention. As shown in FIG. 1, the method of this embodiment includes:

Step 101: Determine a current shooting mode.

An executor of this embodiment may be an image-shooting apparatus, and the image-shooting apparatus may be any device with an image-shooting function, such as a digital camera, a video camera, or a mobile phone with an image-shooting function.

As the image-shooting function of the image-shooting apparatus is increasingly powerful, shooting modes are continuously increased, and quality requirements of users on shot pictures are increasingly high. The quality of a picture is determined by many factors, such as resolution, compression ratio, and effect. The factors that affect the picture quality are combined to form different shooting modes. Taking an example that the factors affecting the quality of a picture include resolution, compression ratio, and effect, and assuming that m resolutions, n compression ratios, and k effects exist, these factors are superimposed to form m*n*p shooting modes, and each shooting mode corresponds to one combination of the resolution, compression ratio, and effect.

When a user uses the image-shooting apparatus to take pictures, a currently used shooting mode (abbreviated as a current shooting mode) needs to be selected. The user may select the current shooting mode with a manual operation. Alternatively, the user does not select a shooting mode, which means that a currently saved shooting mode of the image-shooting apparatus is used as the current shooting mode. The image-shooting apparatus may determine the current shooting mode.

Step 102: Acquire an average value of a picture size before current shooting in the current shooting mode, where the average value of the picture size is calculated according to storage space occupied by pictures shot before the current shooting in the current shooting mode and the number of the pictures shot before the current shooting in the current shooting mode.

After determining the current shooting mode, the image-shooting apparatus acquires the average value of the picture size before the current shooting in the current shooting mode, so as to determine the number of available shots before the current shooting. The average value of the picture size before the current shooting in the current shooting mode represents an average size of storage space that each picture needs to occupy before the current shooting in the current shooting mode.

In this embodiment, the average value of the picture size before the current shooting in each shooting mode may be calculated by the image-shooting apparatus according to the storage space occupied by the pictures shot before the current shooting in the shooting mode and the number of the pictures shot before the current shooting in the shooting mode. Specifically, the image-shooting apparatus may divide the storage space occupied by the pictures shot before the current shooting in the shooting mode by the number of the pictures shot before the current shooting in the shooting mode, to obtain the average value of the picture size before the current shooting in the shooting mode. The average value of the picture size before the current shooting in the current shooting mode may also be obtained by the image-shooting apparatus by dividing the storage space occupied by the pictures shot before the current shooting in the current shooting mode by the number of the pictures shot before the current shooting in the current shooting mode.

The average value of the picture size before the current shooting in each shooting mode is related to storage space occupied by the pictures shot before the current shooting in each shooting mode and the number of the pictures shot before the current shooting in each shooting mode; therefore, the average value of the picture size may vary in different shooting modes. Further, the average value of the picture size before the current shooting in each shooting mode may vary with a change in the number of the shot pictures, which can reflect in real time the average value of the size of the space required by each picture before the current shooting in the shooting mode; therefore, the average value of the picture size calculated according to the storage space occupied by the pictures shot before the current shooting in the shooting mode and the number of the pictures shot before the current shooting in the shooting mode is used to determine the number of available shots before the current shooting in the shooting mode, which helps improving precision of the determined number of available shots.

In an optional implementation manner, the average value of the picture size before the current shooting in the current shooting mode may be pre-calculated and stored by the image-shooting apparatus. The acquiring, by the image-shooting apparatus, an average value of a picture size before current shooting in the current shooting mode specifically includes: directly acquiring, from the storage space, the pre-stored average value of the picture size before the current shooting in the current shooting mode.

In an optional implementation manner, the average value of the picture size in the current shooting mode may be calculated in real time by the image-shooting apparatus according to the storage space occupied by the pictures shot before the current shooting in the current shooting mode and the number of the pictures shot before the current shooting in the current shooting mode.

Step 103: Determine, according to currently available storage space and the average value of the picture size before the current shooting in the current shooting mode, the number of available shots before the current shooting in the current shooting mode.

After acquiring the average value of the picture size before the current shooting in the current shooting mode, the image-shooting apparatus may determine, according to the currently available storage space and the acquired average value of the picture size before the current shooting in the current shooting mode, the number of available shots before the current shooting. Specifically, if the currently available storage space of the image-shooting apparatus is L and the average value of the picture size before the current shooting in the current shooting mode is Q, the number of available shots is Y=L/Q.

In this embodiment, the image-shooting apparatus may acquire the size of the currently available storage space in the image-shooting apparatus. For example, the image-shooting apparatus may access its storage space through an internal interface, so as to acquire the size of the available storage space. For another example, the image-shooting apparatus may record the use condition of the storage space, and obtain the available storage space according to the recorded use condition of the storage space and total capacity of the storage space. Optionally, the shooting modes may share the storage space of the image-shooting apparatus.

Further, the image-shooting apparatus determines the number of available shots before the current shooting in the current shooting mode, and may display the number of available shots to the user, so that the user can know how many pictures can still be taken.

In this embodiment, the image-shooting apparatus determines the current shooting mode, after determining the current shooting mode, acquires the average value of the picture size before the current shooting in the current shooting mode, and determines, according to the currently available storage space and the acquired average value of the picture size, the number of available shots before the current shooting, which solves the problem of determining the number of available shots. Meanwhile, this embodiment uses the average value of the picture size calculated according to the storage space occupied by the pictures shot before the current shooting in the current shooting mode and the number of the pictures shot before the current shooting in the current shooting mode, instead of using a pre-estimated and preset size of space required by each picture, and the average value of the picture size may vary with a change in the number of the shot pictures, which can reflect in real time the size of the space required by each picture before the current shooting in the current shooting mode, so that the determined number of available shots is more realistic, and precision of the determined number of available shots is improved.

Further, optionally, in this embodiment, the average value of the picture size calculated according to the storage space occupied by the pictures shot before the current shooting in the current shooting mode and the number of the pictures shot before the current shooting in the current shooting mode is used as an estimated value of the space required by each picture, which fully considers some practical factors such as hardware and performance of the image-shooting apparatus, and the average value of the picture size may vary with a change in the number of the shot pictures, which is more accurate than an estimated value obtained using image parameters set in a shooting mode in the prior art, thereby improving precision of the determined number of available shots.

Figure 2:
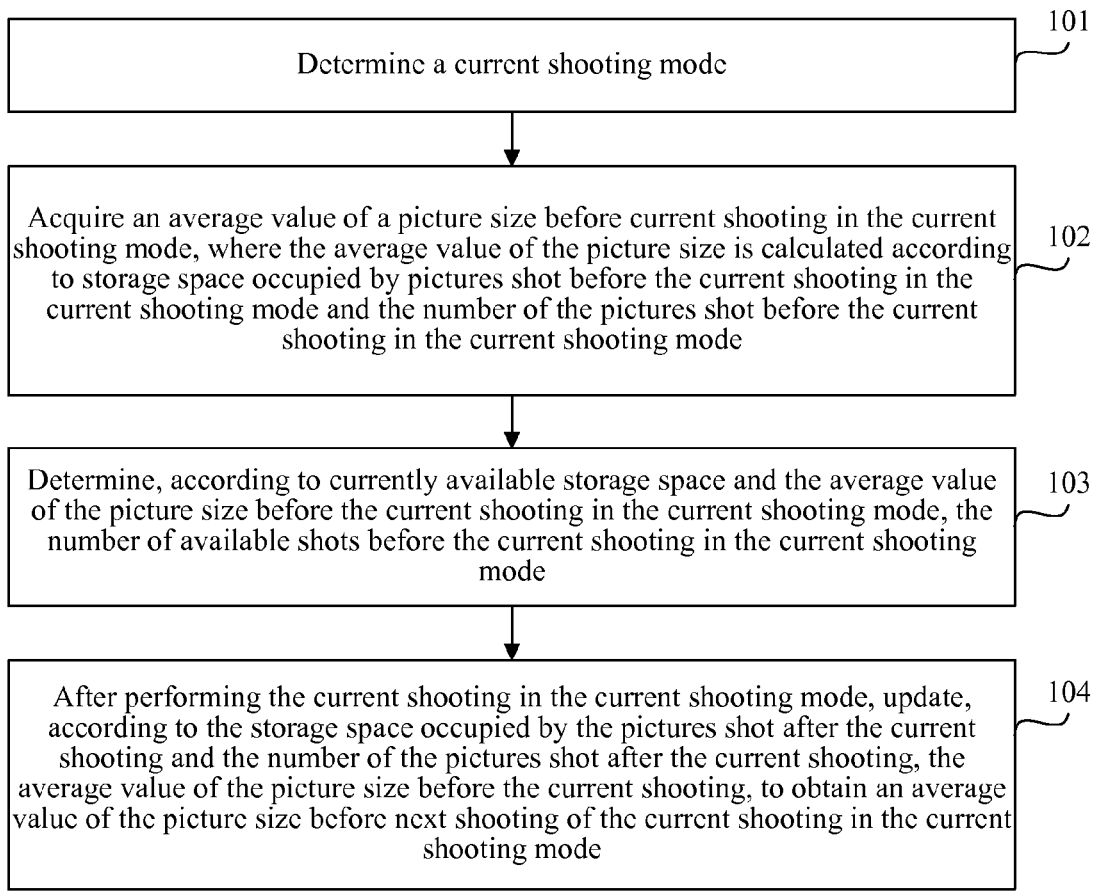
FIG. 2 is a flowchart of a method for determining the number of available shots provided by another embodiment of the present invention.

FIG. 2 is a flowchart of a method for determining the number of available shots provided by another embodiment of the present invention. This embodiment can be implemented based on the embodiment shown in FIG. 1. As shown in FIG. 2, after step 103, the method of this embodiment further includes:

Step 104: After performing the current shooting in the current shooting mode, update, according to the storage space occupied by the pictures shot after the current shooting and the number of the pictures shot after the current shooting, the average value of the picture size before the current shooting, to obtain an average value of the picture size before next shooting of the current shooting in the current shooting mode.

Optionally, after determining the number of available shots before the current shooting in the current shooting mode, the image-shooting apparatus may display the determined number of pictures to the user, so that the user can take pictures accordingly.

It should be noted that, this embodiment does not limit the execution order of the processing procedure of determining by the image-shooting apparatus the number of available shots before the current shooting in the current shooting mode and the current shooting operation in the current shooting mode. For example, the processing procedure of determining by the image-shooting apparatus the number of available shots before the current shooting in the current shooting mode and the current shooting operation in the current shooting mode may be executed at the same time. Preferably, the image-shooting apparatus may perform the current shooting operation in the current shooting mode after determining the number of available shots before the current shooting in the current shooting mode. No matter in which execution order, from the perspective of the user, a preferable effect is that the number of available shots before the current shooting in the current shooting mode can be viewed at the same time or before the execution of the current shooting in the current shooting mode.

After performing the current shooting in the current shooting mode, the image-shooting apparatus may acquire the storage space occupied by the pictures shot after the current shooting in the current shooting mode, and may acquire the number of the pictures shot after the current shooting in the current shooting mode. In one shooting, only one picture may be shot, and multiple pictures may also be continuously shot. If only one picture is shot in one shooting, the image-shooting apparatus may add 1 to the number of the pictures shot before the current shooting in the current shooting mode to obtain the number of the pictures shot after the current shooting in the current shooting mode, and add the storage space occupied by the pictures shot before the current shooting in the current shooting mode with the storage space occupied by the pictures shot in the current shooting in the current shooting mode to obtain the storage space occupied by the pictures shot after the current shooting in the current shooting mode. If x pictures are continuously shot in one shooting, the image-shooting apparatus may add x to the number of the pictures shot before the current shooting in the current shooting mode to obtain the number of the pictures shot after the current shooting in the current shooting mode, and add the storage space occupied by the pictures shot before the current shooting in the current shooting mode with the storage space occupied by the x pictures shot in the current shooting in the current shooting mode to obtain the storage space occupied by the pictures shot after the current shooting in the current shooting mode.

In this embodiment, the image-shooting apparatus may acquire the storage space occupied by the pictures shot in the current shooting. Moreover, the number of the pictures shot before the current shooting in the current shooting mode is stored in the image-shooting apparatus.

Taking an example that only one picture is shot in each shooting, an optional implementation manner of step 104 includes: updating, by the image-shooting apparatus, the average value of the picture size in the current shooting mode according to a formula (1).

$$Vad=(Vas*\text{num}+Vac)/(\text{num}+1) \quad (1)$$

Vad represents a corresponding average value of the picture size before $(k+1)^{th}$ shooting in the current shooting mode, Vas represents a corresponding average value of the picture size before $k^{th}$ shooting in the current shooting mode, Vac represents the storage space occupied by the pictures shot in the $k^{th}$ shooting in the current shooting mode, and num represents the number of the pictures shot before the $k^{th}$ shooting in the current shooting mode. (Vas*num+Vac) represents the storage space occupied by the pictures shot before the $(k+1)^{th}$ shooting in the current shooting mode, that is, the storage space occupied by the pictures shot after the $k^{th}$ shooting in the current shooting mode; and (num+1) represents the number of the pictures shot before the $(k+1)^{th}$ shooting in the current shooting mode, that is, the number of the pictures shot after the $k^{th}$ shooting in the current shooting mode. In the formula (1), the $k^{th}$ shooting represents the current shooting, and the $(k+1)^{th}$ shooting represents the next shooting of the current shooting.

In the foregoing parameter information, the image-shooting apparatus needs to save the number of the pictures shot before the $(k+1)^{th}$ shooting in the current shooting mode and two parameters of the corresponding average value of the picture size before the $(k+1)^{th}$ shooting.

It should be noted that, if the current shooting mode is used for the first time to take pictures, Vas in the formula (1) is a preset initial value of the picture size, num is 0, and the calculated Vad is actually the storage space occupied by the pictures shot in the $k^{th}$ shooting in the current shooting mode.

In the foregoing optional implementation manner, the image-shooting apparatus may calculate, according to the stored number of the pictures shot before the current shooting in the current shooting mode, the stored average value of the picture size before the current shooting in the current shooting mode, and the storage space occupied by the pictures shot in the current shooting, the storage space occupied by the pictures shot after the current shooting in the current shooting mode, which is simple in calculation and easy to implement, has a relatively small amount of parameter information required to be stored, and saves the storage space.

In this embodiment, after performing the current shooting in the current shooting mode, the image-shooting apparatus updates the average value of the picture size before the current shooting in the current shooting mode, to obtain the average value of the picture size before the next shooting of the current shooting, so as to determine the number of available shots before the next shooting of the current shooting in the shooting mode, and enable the average value of the picture size before each shooting in the shooting mode to vary in real time with an increase in the number of the shot pictures, which improves precision of the determined number of available shots before each shooting. Further, the method of this embodiment actually obtains through statistics an average value of the storage space occupied by the pictures shot in the current shooting mode and determines the number of available shots according to the average value obtained through statistics and the currently available storage space, instead of presetting a size of space required by each picture in each shooting mode, which solves the problem of presetting the size of the space required by each picture in each shooting mode.

In an optional implementation manner of the foregoing embodiments, step 102: the acquiring an average value of a picture size before current shooting in the current shooting mode may include:

Step 1021: Acquire, according to the current shooting mode, a first index value corresponding to the current shooting mode.

In this embodiment, each shooting mode uniquely corresponds to one index value. The corresponding index value of the current shooting mode is the first index value. Optionally, after determining the current shooting mode, the image-shooting apparatus may generate, according to the current shooting mode, the first index value corresponding to the current shooting mode. The image-shooting apparatus may generate the first index value according to the current shooting mode in various implementation manners, for example, generating a unique index value according to a certain generation algorithm by using one or more pieces of information such as resolution, compression ratio, and effect in the current shooting mode. Optionally, the image-shooting apparatus may also directly acquire the pre-stored first index value corresponding to the current shooting mode after determining the current shooting mode.

Step 1022: Determine whether the first index value exists in a first correspondence table; when a determination result is yes, that is, when the first index value exists in the first correspondence table, perform step 1023; and when the determination result is not, that is, when the first index value does not exist in the first correspondence table, perform step 1024.

In this embodiment, the first correspondence table is established in the image-shooting apparatus. The first correspondence table is used to store correspondence between the first index value and the average value of the picture size before the current shooting in the current shooting mode. More specifically, the first correspondence table is used to, in the case that the current shooting mode has been used, store the correspondence between the first index value and the average value of the picture size before the current shooting in the current shooting mode. That the current shooting mode has been used refers to that the shooting mode has been used for a shooting operation. In an optional implementation manner, the correspondence between the first index value and the average value of the picture size before the current shooting in the current shooting mode is stored in a form of a key-value pair in the first correspondence table. The key (key) in the key-value pair represents the first index value, and the value (Value) in the key-value pair represents the corresponding average value of the picture size.

Based on the foregoing, after acquiring the first index value corresponding to the current shooting mode, the image-shooting apparatus searches the first correspondence table according to the first index value, and determines whether the first index value exists in the first correspondence table. If the determination result is that the first index value exists in the first correspondence table, it indicates that the current shooting mode has been used for a shooting operation; and if the determination result is that the first index value does not exist in the first correspondence table, it indicates that the current shooting mode has not been used for any shooting operation, and this is the first time to use the current shooting mode to take pictures.

Step 1023: Acquire, from the first correspondence table, the average value of the picture size corresponding to the first index value.

After determining that the first index value exists in the first correspondence table, the image-shooting apparatus acquires, from the first correspondence table, the average value of the picture size corresponding to the first index value, that is, the average value of the picture size before the current shooting in the current shooting mode.

Step 1024: Acquire a preset initial value of the picture size as the average value of the picture size before the current shooting in the current shooting mode, and store the first index value and the preset initial value of the picture size in the first correspondence table.

When it is determined that the first index value does not exist in the first correspondence table, which indicates that the current shooting mode is used for the first time to take pictures, the image-shooting apparatus acquires the preset initial value of the picture size as the average value of the picture size before the current shooting in the current shooting mode. The preset initial value of the picture size may be an empirical value.

In a preferred implementation manner, all the shooting modes may use the same preset initial value of the picture size, and in this way, the initial value of the picture size only needs to be preset once, which helps reducing operations of presetting the initial value of the picture size and improves efficiency. In the preferred implementation manner, the average value of the picture size calculated according to the storage space occupied by the pictures shot before the current shooting in the current shooting mode and the number of the pictures shot before the current shooting in the current shooting mode is used to replace a preset size of space required by each picture in the shooting mode in the image-shooting apparatus in the prior art, so that there is no need to preset the size of the space required by each picture in each shooting mode, and the initial value of the picture size only needs to be preset once, which solves the problem that the size of the space required by each picture in each shooting mode needs to be preset in the image-shooting apparatus in order to determine the number of available shots, thereby solving the problems, such as complex operations and low efficiency, caused by presetting of the size of the space required by each picture.

In addition to the preferred implementation manner, a manner that a part of shooting modes share one preset initial value of the picture size may be adopted, and multiple initial values of the picture size may need to be preset (the number of the initial values is smaller than the total number of the shooting modes). Further, a manner that each shooting mode independently uses one initial value of the picture size may also be adopted.

Further, the image-shooting apparatus may also need to add the first index value and the preset initial value of the picture size in the first correspondence table, so as to ensure that when the current shooting mode is used to take pictures subsequently, the corresponding average value of the picture size can be acquired. This operation is equal to initializing the average value of the picture size before the first shooting in the current shooting mode.

Further, the user may use the image-shooting apparatus to perform the current shooting operation in the current shooting mode. For example, the user may perform the current shooting by pressing a shoot button, clicking a shoot option, clicking the touch screen, or the like.

In the foregoing optional implementation manner in step 102, when the first index value exists in the first correspondence table, the corresponding average value of the picture size, stored in the first correspondence table, before the current shooting in the current shooting mode may be calculated through the following step. Specifically, before step 1022, the method includes:

Step 1022a: Calculate, according to a formula (2), the average value of the picture size before the current shooting in the current shooting mode.

$$V_{k-1}=(V_{k-2}*n_{k-2}+a)/n_{k-1} \qquad (2)$$

$V_{k-1}$ represents the average value of the picture size before the current shooting in the current shooting mode. $V_{k-2}$ represents an average value of a picture size, stored in the first correspondence table, before previous shooting of the current shooting in the current shooting mode. a represents storage space occupied by pictures shot in the previous shooting of the current shooting in the current shooting mode. $n_{k-1}$ represents the number of the pictures shot before the current shooting in the current shooting mode. $n_{k-2}$ represents the number of pictures shot before the previous shooting of the current shooting in the current shooting mode. Further, the image-shooting apparatus in this embodiment may record and store the number of the pictures shot before each shooting in the current shooting mode by using a counter or the like. Optionally, the number of the pictures shot before each shooting may be stored in the first correspondence table, but the present invention is not limited thereto.

It should be noted that, if the current shooting is the $k^{th}$ shooting, the previous shooting of the current shooting may be identified as the $(k-1)^{th}$ shooting.

Step 1022b: Update, according to the acquired average value of the picture size before the current shooting in the current shooting mode, the first correspondence table. The operation of updating the first correspondence table is actually replacing $V_{k-2}$ in the first correspondence table with $V_{k-1}$.

Step 1022a and step 1022b may specifically be performed after the previous shooting of the current shooting in the current shooting mode, and step 1022a and step 1022b actually describe a process of updating, according to the average value of the picture size before the previous shooting of the current shooting in the current shooting mode and the storage space occupied by the pictures shot in the previous shooting of the current shooting, the average value of the picture size before the previous shooting of the current shooting in the current shooting mode, to obtain the average value of the picture size before the current shooting in the current shooting mode.

Figure 3:
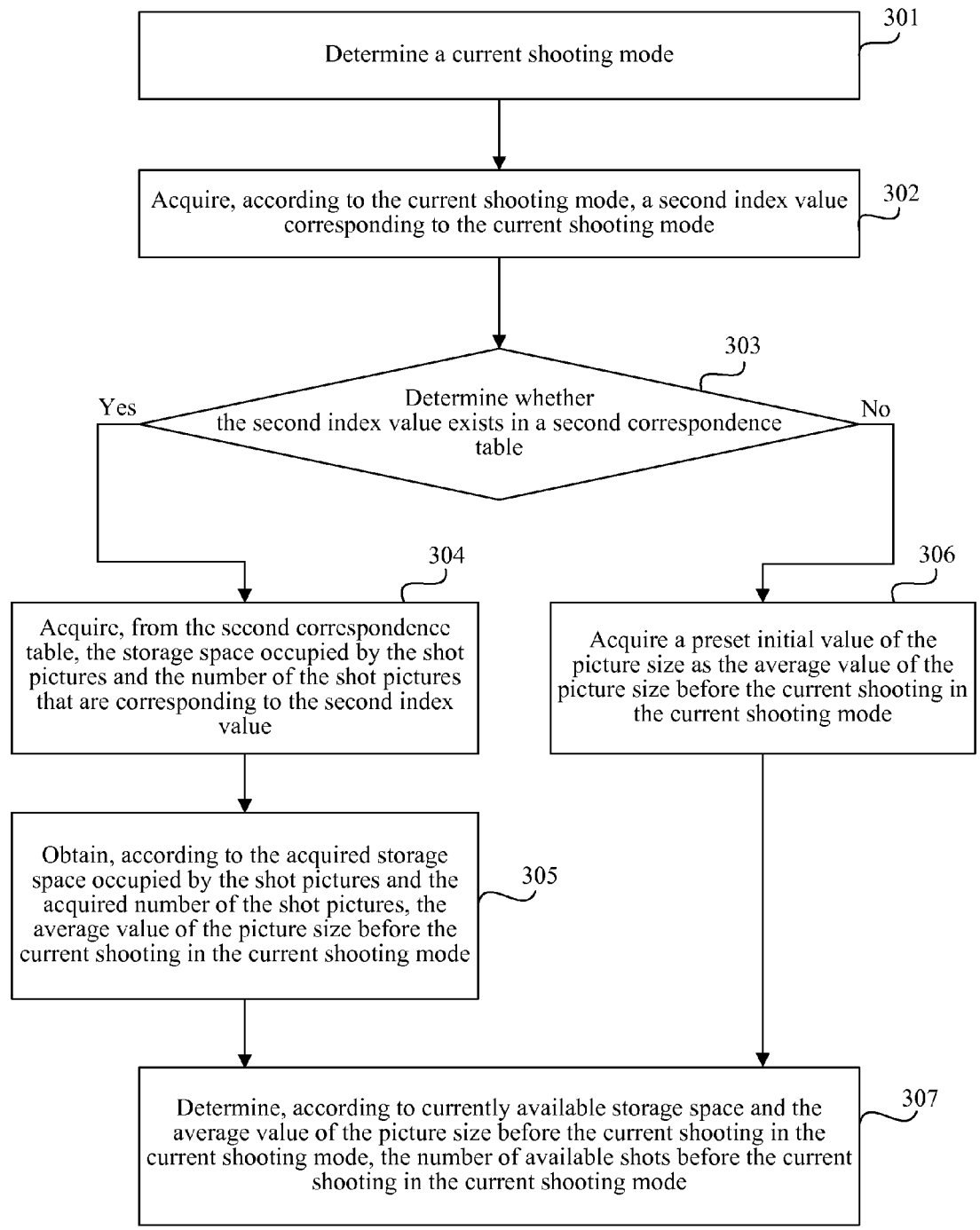
FIG. 3 is a flowchart of a method for determining the number of available shots provided by still another embodiment of the present invention.

FIG. 3 is a flowchart of a method for determining the number of available shots provided by still another embodiment of the present invention. As shown in FIG. 3, the method of this embodiment includes:

Step 301: Determine a current shooting mode.

For step 301, reference may be made to the description in step 101, and the details may not be repeated herein.

Step 302: Acquire, according to the current shooting mode, a second index value corresponding to the current shooting mode.

In this embodiment, each shooting mode uniquely corresponds to one index value. In this embodiment, the corresponding index value of the current shooting mode is the second index value. Optionally, after determining the current shooting mode, the image-shooting apparatus may generate, according to the current shooting mode, the second index value corresponding to the current shooting mode. The image-shooting apparatus may generate the second index value according to the current shooting mode in various implementation manners, for example, generating a unique index value according to a certain generation algorithm by using one or more pieces of information such as resolution, compression ratio, and effect in the current shooting mode. Optionally, the image-shooting apparatus may also directly acquire the pre-stored second index value corresponding to the current shooting mode after determining the current shooting mode.

Step 303: Determine whether the second index value exists in a second correspondence table; when a determination result is yes, that is, when the second index value exists in the second correspondence table, perform step 304; and when the determination result is not, that is, when the second index value does not exist in the second correspondence table, perform step 306.

In this embodiment, the second correspondence table is established in the image-shooting apparatus. The second correspondence table is used to store correspondence between the second index value, the storage space occupied by the pictures shot before the current shooting in the current shooting mode, and the number of the pictures shot before the current shooting in the current shooting mode. More specifically, the second correspondence table is used to, after the current shooting mode has been used, store the correspondence between the second index value, the storage space occupied by the pictures shot before the current shooting in the current shooting mode, and the number of the pictures shot before the current shooting in the current shooting mode. That the current shooting mode has been used refers to that the shooting mode has been used for a shooting operation.

Based on the foregoing, after acquiring the second index value corresponding to the current shooting mode, the image-shooting apparatus searches the second correspondence table according to the second index value, and determines whether the second index value exists in the second correspondence table. If the determination result is that the second index value exists in the second correspondence table, it indicates that the current shooting mode has been used for a shooting operation; and if the determination result is that the second index value does not exist in the second correspondence table, it indicates that the current shooting mode has not been used for any shooting operation, and this is the first time to use the current shooting mode to take pictures.

Step 304: Acquire, from the second correspondence table, the storage space occupied by the shot pictures and the number of the shot pictures that are corresponding to the second index value.

Step 305: Obtain, according to the acquired storage space occupied by the shot pictures and the acquired number of the shot pictures, the average value of the picture size before the current shooting in the current shooting mode, and then perform step 307.

After determining that the second index value exists in the second correspondence table, the image-shooting apparatus acquires, from the second correspondence table, the storage space occupied by the shot pictures and the number of the shot pictures that are corresponding to the second index value. The storage space occupied by the shot pictures corresponding to the second index value is the storage space occupied by the pictures shot before the current shooting in the current shooting mode, and the number of the shot pictures corresponding to the second index value is the number of the pictures shot before the current shooting in the current shooting mode. Then, the image-shooting apparatus divides the acquired storage space occupied by the shot pictures by the acquired number of the shot pictures, to obtain the corresponding average value of the picture size before the current shooting in the current shooting mode.

Step 306: Acquire a preset initial value of the picture size as the average value of the picture size before the current shooting in the current shooting mode, and then perform step 307.

When it is determined that the second index value does not exist in the second correspondence table, which indicates that the current shooting mode is used for the first time to take pictures, the image-shooting apparatus acquires the preset initial value of the picture size as the average value of the picture size in the current shooting mode. The preset initial value of the picture size may be an empirical value. For description of the preset initial value of the picture size, reference may be made to step 1024.

Step 307: Determine, according to currently available storage space and the average value of the picture size before the current shooting in the current shooting mode, the number of available shots before the current shooting in the current shooting mode.

For step 307, reference may be made to the description in step 103, and the details may not be repeated herein.

It should be noted that, step 302 to step 305 in this embodiment may be considered as another implementation manner of the acquiring an average value of a picture size before current shooting in the current shooting mode in step 102.

Further, after determining the number of available shots before the current shooting in the current shooting mode, the image-shooting apparatus may display the determined number of available shots to the user, so that the user can take pictures accordingly.

Further, the user may use the image-shooting apparatus to perform the current shooting operation in the current shooting mode. For example, the user may perform shooting by pressing a shoot button, clicking a shoot option, clicking the touch screen, or the like.

Preferably, the processing procedure of determining by the image-shooting apparatus the number of available shots before the current shooting in the current shooting mode may be executed before the current shooting operation in the current shooting mode.

In the embodiment shown in FIG. 3, when the second index value exists in the second correspondence table, the storage space occupied by the pictures shot before the current shooting in the current shooting mode and the number of the pictures shot before the current shooting in the current shooting mode that are stored in the second correspondence table may be calculated through the following step. Specifically, before step 303, the method includes:

Step 303a: Calculate, according to a formula (3), the storage space occupied by the pictures shot before the current shooting in the current shooting mode.

$$M_{k-1} = M_{k-2} + a \qquad (3)$$

$M_{k-1}$ represents the storage space occupied by the pictures shot before the current shooting in the current shooting mode. $M_{k-2}$ represents storage space occupied by pictures, stored in the second correspondence table, shot before previous shooting of the current shooting in the current shooting mode. a represents storage space occupied by pictures shot in the previous shooting of the current shooting in the current shooting mode.

Step 303b: Calculate, according to a formula (4), the number of the pictures shot before the current shooting in the current shooting mode.

$$n_{k-1} = n_{k-2} + b \qquad (4)$$

$n_{k-1}$ represents the number of the pictures shot before the current shooting in the current shooting mode, $n_{k-2}$ represents the number of the pictures, stored in the second correspondence table, shot before the previous shooting of the current shooting in the current shooting mode, and b represents the number of the pictures shot before the previous shooting of the current shooting in the current shooting mode, where $b \geq 1$.

Step 303c: Update, according to the storage space occupied by the pictures shot before the current shooting in the current shooting mode and the number of the pictures shot before the current shooting in the current shooting mode, the second correspondence table.

The updating the second correspondence table specifically includes: using $M_{k-1}$ to replace $M_{k-2}$ in the second correspondence table, and using $n_{k-1}$ to replace $n_{k-2}$ in the second correspondence table.

Step 303a and step 303c may specifically be performed after the previous shooting of the current shooting in the current shooting mode, and step 303a and step 303c actually describe a process of, after the previous shooting of the current shooting in the current shooting mode, updating, according to the storage space and the number of the pictures shot in the previous shooting of the current shooting, the storage space occupied by the pictures shot before the previous shooting of the current shooting and the number of the pictures shot before the previous shooting of the current shooting, to obtain the storage space occupied by the pictures shot before the current shooting in the current shooting mode and the number of the pictures shot before the current shooting in the current shooting mode.

In this embodiment, the image-shooting apparatus stores the storage space occupied by the pictures shot before the current shooting in the current shooting mode and the number of the pictures shot before the current shooting, when determining to perform the current shooting in the current mode, calculates in real time, according to the stored storage space occupied by the pictures shot before the current shooting in the current shooting mode and the stored number of the pictures shot before the current shooting, the average value of the picture size before the current shooting in the current shooting mode, and determines the number of available shots before current shooting in the current shooting mode by using the calculated average value of the picture size and the currently available storage space, which solves the problem of determining the number of available shots. Meanwhile, this embodiment uses the average value of the picture size calculated in real time according to the storage space occupied by the pictures shot before the current shooting in the current shooting mode and the number of the pictures shot before the current shooting in the current shooting mode, instead of using a pre-estimated and preset size of space required by each picture, and the average value of the picture size may vary with a change in the number of the shot pictures, which can reflect in real time the size of the space required by the picture in the current shooting mode, so that the determined number of available shots is more realistic, and precision of the determined number of available shots is improved.

Further, when the initial value of the picture size is preset only once, this embodiment uses the average value of the picture size calculated according to the storage space occupied by the pictures shot before the current shooting in the current shooting mode and the number of the pictures shot before the current shooting to replace the preset size of the space required by each picture in the shooting mode in the image-shooting apparatus in the prior art, so that there is no need to preset the size of the space required by each picture in each shooting mode, which solves the problem that the size of the space required by each picture in each shooting mode needs to be preset in the image-shooting apparatus in order to determine the number of available shots, thereby solving the problems, such as complex operations and low efficiency, caused by presetting of the size of the space required by each picture.

Further optionally, in this embodiment, the average value of the picture size calculated according to the storage space occupied by the pictures shot before the current shooting in the current shooting mode and the number of the pictures shot before the current shooting is used as an estimated value of the space required by each picture, which fully considers some practical factors such as hardware and performance of the image-shooting apparatus, and the average value of the picture size may vary with a change in the number of the shot pictures, which is more accurate than an estimated value obtained using image parameters set in a shooting mode in the prior art, thereby improving precision of the determined number of available shots.

Figure 4:
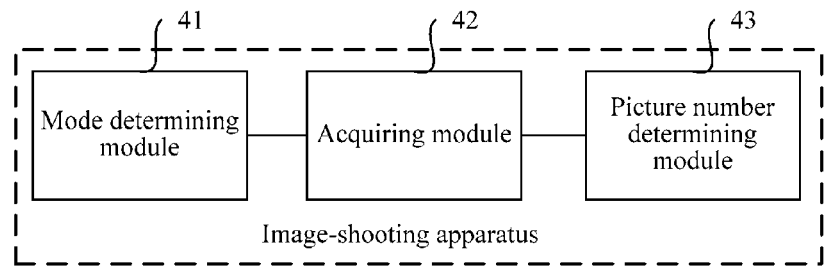
FIG. 4 is a schematic structural diagram of an image-shooting apparatus provided by an embodiment of the present invention.

FIG. 4 is a schematic structural diagram of an image-shooting apparatus provided by an embodiment of the present invention. As shown in FIG. 4, the apparatus of this embodiment includes: a mode determining module 41, an acquiring module 42, and a picture number determining module 43.

The mode determining module 41 is configured to determine a current shooting mode. The acquiring module 42 is connected to the mode determining module 41, and is configured to acquire an average value of a picture size, determined by the mode determining module 41, before the current shooting in the current shooting mode, where the average value of the picture size before the current shooting in the current shooting mode is calculated according to storage space occupied by pictures shot before the current shooting in the current shooting mode and the number of the pictures shot before the current shooting in the current shooting mode. The picture number determining module 43 is connected to the acquiring module 42, and is configured to determine, according to currently available storage space and the average value of the picture size, acquired by the acquiring module 42, before the current shooting in the current shooting mode, the number of available shots before the current shooting in the current shooting mode. The image-shooting apparatus of this embodiment may be any device with an image-shooting function, such as a digital camera, a video camera, a mobile phone with an image-shooting function, or a computer with an image-shooting function.

The function modules of the image-shooting apparatus in this embodiment may be configured to execute the process of the method for determining the number of available shots shown in FIG. 1, specific working principles of the function modules are not repeated herein, and reference may be made to the description of the method embodiment for details.

It should be noted that, in addition to the foregoing function modules, the image-shooting apparatus of this embodiment also has a storage module, a power source module, an interface module connected to a peripheral, a shooting module, and the like, and these modules are not shown in the drawing.

In the image-shooting apparatus of this embodiment, the mode determining module determines the current shooting mode, after the mode determining module determines the current shooting mode, the acquiring module acquires the average value of the picture size before the current shooting in the current shooting mode, and the picture number determining module determines, according to the currently available storage space and the average value of the picture size before the current shooting in the current shooting mode, the number of available shots before the current shooting in the current shooting mode, which solves the problem of determining the number of available shots. Meanwhile, the image-shooting apparatus of this embodiment uses the average value of the picture size calculated according to the storage space occupied by the pictures shot before the current shooting in the current shooting mode and the number of the pictures shot before the current shooting in the current shooting mode, instead of using a pre-estimated and preset size of space required by each picture, and the average value of the picture size may vary with a change in the number of the shot pictures, which can reflect in real time the size of the space required by the picture in the current shooting mode, so that the determined number of available shots is more realistic, and precision of the determined number of available shots is improved.

Further optionally, the image-shooting apparatus of this embodiment uses the average value of the picture size calculated according to the storage space occupied by the pictures shot before the current shooting in the current shooting mode and the number of the pictures shot before the current shooting in the current shooting mode as an estimated value of the space required by each picture, which fully considers some practical factors such as hardware and performance of the image-shooting apparatus, and the average value of the picture size may vary with a change in the number of the shot pictures, which is more accurate than an estimated value obtained using image parameters set in a shooting mode in the prior art, thereby improving precision of the determined number of available shots.

Figure 5:
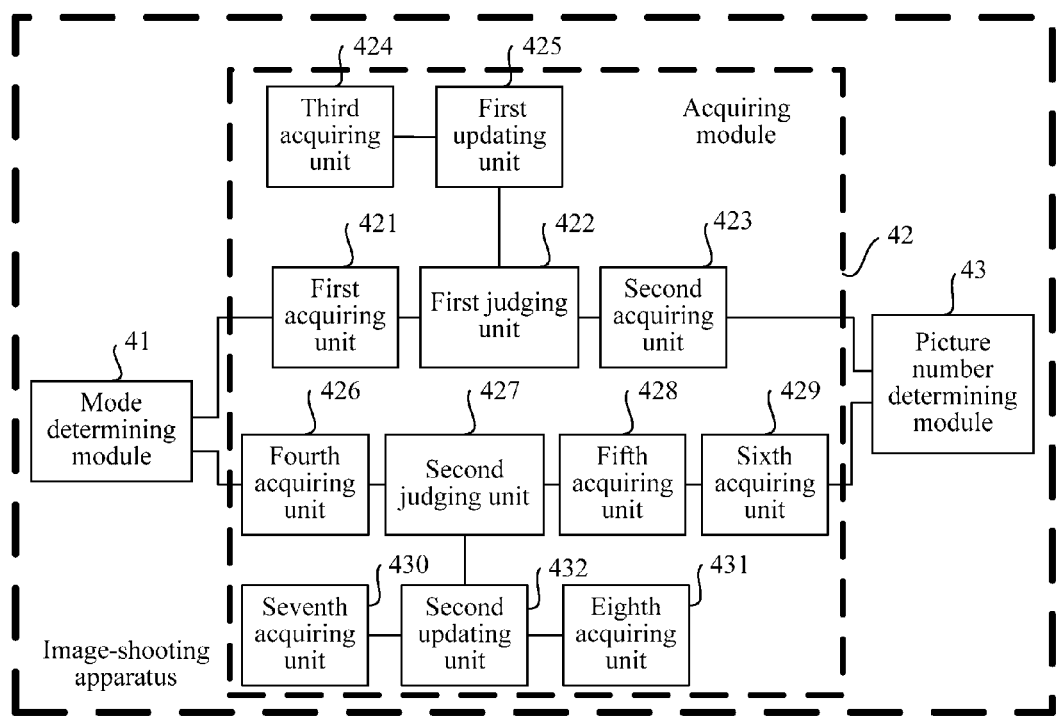
FIG. 5 is a schematic structural diagram of an image-shooting apparatus provided by another embodiment of the present invention.

FIG. 5 is a schematic structural diagram of an image-shooting apparatus provided by another embodiment of the present invention. This embodiment is implemented based on the embodiment shown in FIG. 4. As shown in FIG. 5, the image-shooting apparatus of this embodiment also includes a mode determining module 41, an acquiring module 42, and a picture number determining module 43.

In this embodiment, an optional implementation structure of the acquiring module 42 includes: a first acquiring unit 421, a first judging unit 422, and a second acquiring unit 423.

The first acquiring unit 421 is connected to the mode determining module 41, and is configured to acquire, according to the current shooting mode determined by the mode determining module 41, a first index value corresponding to the current shooting mode. The first judging unit 422 is connected to the first acquiring unit 421, and is configured to determine whether the first index value acquired by the first acquiring unit 421 exists in a first correspondence table. The first correspondence table is used to store correspondence between the first index value and the average value of the picture size before the current shooting in the current shooting mode. The second acquiring unit 423 is connected to the first judging unit 422, and is configured to, when a determination result of the first judging unit 422 is that the first index value exists in the first correspondence table, acquire, from the first correspondence table, the average value of the picture size corresponding to the first index value. The second acquiring unit 423 is also connected to the picture number determining module 43, and is configured to provide the average value of the picture size corresponding to the first index value to the picture number determining module 43, that is, the corresponding average value of the picture size before the current shooting in the current shooting mode.

Optionally, when the determination result of the first judging unit 422 is that the first index value does not exist in the first correspondence table, the second acquiring unit 423 acquires a preset initial value of the picture size as the average value of the picture size before the current shooting in the current shooting mode. Further, the second acquiring unit 423 may further add the first index value and the preset initial value of the picture size in the first correspondence table.

Based on the implemention structure of the acquiring module 42, the acquiring module 42 may further include: a third acquiring unit 424 and a first updating unit 425.

The third acquiring unit 424 is configured to calculate, according to the formula (2), the average value of the picture size before the current shooting in the current shooting mode. For the formula (2), reference may be made to the description in the foregoing method embodiment.

The first updating unit 425 is connected to the third acquiring unit 424, and is configured to update, according to the average value of the picture size, calculated by the third acquiring unit 424, before the current shooting in the current shooting mode, the first correspondence table. Optionally, the first updating unit 425 is connected to the first judging unit 422, and is configured to provide the updated first correspondence table to the first judging unit 422.

The foregoing functional units may be configured to execute the corresponding process in the optional implementation manner in step 102 of the foregoing method embodiment, specific working principles of the functional units are not repeated herein, and reference may be made to the description of the method embodiment for details.

In this embodiment, another optional implemention structure of the acquiring module 42 includes: a fourth acquiring unit 426, a second judging unit 427, a fifth acquiring unit 428, and a sixth acquiring unit 429.

The fourth acquiring unit 426 is connected to the mode determining module 41, and is configured to acquire, according to the current shooting mode determined by the mode determining module 41, a second index value corresponding to the current shooting mode. The second judging unit 427 is connected to the fourth acquiring unit 426, and is configured to determine whether the second index value acquired by the fourth acquiring unit 426 exists in a second correspondence table. The second correspondence table is used to store correspondence between the second index value, the storage space occupied by the pictures shot before the current shooting in the current shooting mode, and the number of the pictures shot before the current shooting in the current shooting mode. The fifth acquiring unit 428 is connected to the second judging unit 427, and is configured to, when a determination result of the second judging unit 427 is that the second index value exists in the second correspondence table, acquire, from the second correspondence table, the storage space occupied by the shot pictures and the number of the shot pictures that are corresponding to the second index value. The sixth acquiring unit 429 is connected to the fifth acquiring unit 428, and is configured to obtain, according to the storage space occupied by the shot pictures acquired by the fifth acquiring unit 428 and the number of the shot pictures acquired by the fifth acquiring unit 428, the average value of the picture size before the current shooting in the current shooting mode. The sixth acquiring unit 429 is also connected to the picture number determining module 43, and is configured to provide the average value of the picture size before the current shooting in the current shooting mode to the picture number determining module 43.

Optionally, when the determination result of the second judging unit 427 is that the second index value does not exist in the second correspondence table, the sixth acquiring unit 429 may acquire the preset initial value of the picture size as the average value of the picture size in the current shooting mode.

In a preferred implementation manner, the initial value of the picture size is preset once in the image-shooting apparatus, and all the shooting modes use the same initial value of the picture size, but the present invention is not limited thereto.

Based on another implemention structure of the acquiring module 42, the acquiring module 42 further includes: a seventh acquiring unit 430, an eighth acquiring unit 431, and a second updating unit 432.

The seventh acquiring unit 430 is configured to calculate, according to the formula (3), the storage space occupied by the pictures shot before the current shooting in the current shooting mode. The eighth acquiring unit 431 is configured to calculate, according to the formula (4), the number of the pictures shot before the current shooting in the current shooting mode. For the formula (3) and the formula (4), reference may be made to the description in the foregoing method embodiment.

The second updating unit 432 is connected to the seventh acquiring unit 430 and the eighth acquiring unit 431, and is configured to update the second correspondence table according to the storage space occupied by the pictures, acquired by the seventh acquiring unit 430, shot before the current shooting in the current shooting mode and the number of the shot pictures, acquired by the eighth acquiring unit 431, before the current shooting in the current shooting mode. Optionally, the second updating unit 432 is connected to the second judging unit 427, and is configured to provide the updated second correspondence table to the second judging unit 427.

The functional units may be configured to execute the corresponding process in the method embodiment shown in FIG. 3, specific working principles of the functional units are not repeated herein, and reference may be made to the description of the method embodiment for details.

In the image-shooting apparatus of this embodiment, the mode determining module determines the current shooting mode, after the mode determining module determines the current shooting mode, the acquiring module acquires the average value of the picture size before the current shooting in the current shooting mode, and the picture number determining module determines, according to the currently available storage space and the average value of the picture size before the current shooting in the current shooting mode, the number of available shots before the current shooting in the current shooting mode, which solves the problem of determining the number of available shots. Meanwhile, the image-shooting apparatus of this embodiment uses the average value of the picture size calculated according to the storage space occupied by the pictures shot before the current shooting in the current shooting mode and the number of the pictures shot before the current shooting in the current shooting mode, instead of using a pre-estimated and preset size of space required by each picture, and the average value of the picture size may vary with a change in the number of the shot pictures, which can reflect in real time the size of the space required by the picture in the current shooting mode, so that the determined number of available shots is more realistic, and precision of the determined number of available shots is improved.

Further, when the initial value of the picture size is preset only once, the image-shooting apparatus of this embodiment uses the average value of the picture size calculated according to the storage space occupied by the pictures shot before the current shooting in the current shooting mode and the number of the pictures shot before the current shooting in the current shooting mode to replace the preset size of the space required by each picture in the shooting mode in the image-shooting apparatus in the prior art, so that there is no need to preset the size of the space required by each picture in each shooting mode, which solves the problem that the size of the space required by each picture in each shooting mode needs to be preset in the image-shooting apparatus in order to determine the number of available shots, thereby solving the problems, such as complex operations and low efficiency, caused by presetting of the size of the space required by each picture.

Further, optionally, the image-shooting apparatus of this embodiment uses the average value of the picture size calculated according to the storage space occupied by the pictures shot before the current shooting in the current shooting mode and the number of the pictures shot before the current shooting in the current shooting mode as an estimated value of the space required by each picture, which fully considers some practical factors such as hardware and performance of the image-shooting apparatus, and the average value of the picture size may vary with a change in the number of the shot pictures, which is more accurate than an estimated value obtained using image parameters set in a shooting mode in the prior art, thereby improving precision of the determined number of available shots.

Figure 6:
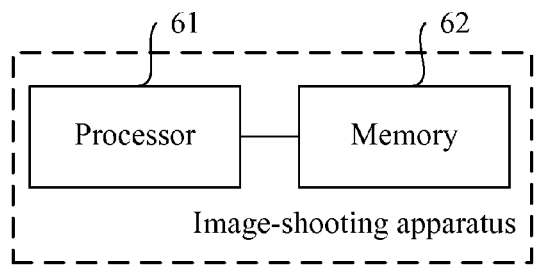
FIG. 6 is a schematic structural diagram of an image-shooting apparatus provided by still another embodiment of the present invention.

FIG. 6 is a schematic structural diagram of an image-shooting apparatus provided by still another embodiment of the present invention. As shown in FIG. 6, the image-shooting apparatus may include: at least one processor 61 and a memory 62, the memory 62 is configured to store executable program code, and the processor 61 reads the executable program code stored in the memory 62 to run a program corresponding to the executable program code, so as to: determine a current shooting mode, acquire an average value of a picture size before current shooting in the current shooting mode, and determine, according to currently available storage space and the acquired average value of the picture size before the current shooting in the current shooting mode, the number of available shots before the current shooting in the current shooting mode. The average value of the picture size is calculated according to the storage space occupied by the pictures shot before the current shooting in the current shooting mode and the number of the pictures shot before the current shooting in the current shooting mode.

In an optional implementation manner of this embodiment, the processor 61 is further configured to, after the image-shooting apparatus (specifically, the shooting module of the image-shooting apparatus) performs the current shooting in the current shooting mode, update, according to the storage space occupied by the pictures shot after the current shooting and the number of the pictures shot after the current shooting, the average value of the picture size before the current shooting in the current shooting mode, to obtain an average value of the picture size before next shooting of the current shooting in the current shooting mode.

In an optional implementation manner of this embodiment, the processor 61 may specifically update, according to the formula (1), the average value of the picture size before the current shooting in the current shooting mode, to obtain an average value of the picture size before next shooting of the current shooting in the current shooting mode. For the formula (1), reference may be made to the description in the foregoing embodiment.

In an optional implementation manner of this embodiment, the processor 61 may be specifically configured to acquire, according to the current shooting mode, a first index value corresponding to the current shooting mode, determine whether the first index value exists in a first correspondence table, and when a determination result is that the first index value exists in the first correspondence table, acquire, from the first correspondence table, the average value of the picture size corresponding to the first index value. The first correspondence table is used to store correspondence between the first index value and the average value of the picture size before the current shooting in the current shooting mode.

Further, optionally, when the determination result is that the first index value does not exist in the first correspondence table, the processor 61 may acquire a preset initial value of the picture size as the average value of the picture size before the current shooting in the current shooting mode.

Further, before determining whether the first index value exists in the first correspondence table, the processor 61 may further acquire, according to the formula (2), the average value of the picture size before the current shooting in the current shooting mode, and update, according to the acquired average value of the picture size before current shooting in the current shooting mode, the first correspondence table. Specifically, the operation may be performed after previous shooting of the current shooting in the current shooting mode.

In an optional implementation manner of this embodiment, the processor 61 may be specifically configured to acquire, according to the current shooting mode, a second index value corresponding to the current shooting mode, determine whether the second index value exists in a second correspondence table, when a determination result is that the second index value exists in the second correspondence table, acquire, from the second correspondence table, the storage space occupied by the shot pictures and the number of the shot pictures that are corresponding to the second index value, and obtain, according to the acquired storage space occupied by the shot pictures and the acquired number of the shot pictures, the average value of the picture size. Specifically, the processor 61 may divide the acquired storage space occupied by the shot pictures by the acquired number of the shot pictures, to obtain the average value of the picture size. The second correspondence table is used to store correspondence between the second index value, the storage space occupied by the pictures shot before the current shooting in the current shooting mode, and the number of the pictures shot before the current shooting in the current shooting mode.

Further, optionally, when the determination result is that the second index value does not exist in the second correspondence table, the processor 61 may acquire the preset initial value of the picture size as the average value of the picture size before the current shooting in the current shooting mode. In a preferred implementation manner, the initial value of the picture size is preset once in the image-shooting apparatus, and all the shooting modes use the same initial value of the picture size, but the present invention is not limited thereto.

Based on the foregoing, before determining whether the second index value exists in the second correspondence table, the processor 61 may further calculate the storage space occupied by the pictures shot before the current shooting in the current shooting mode according to the formula (3), calculate the number of the pictures shot before the current shooting in the current shooting mode according to the formula (4), and update the second correspondence table according to the acquired storage space occupied by the pictures shot before the current shooting in the current shooting mode and the acquired number of the pictures shot before the current shooting in the current shooting mode. Specifically, the operation may be performed after previous shooting of the current shooting in the current shooting mode.

It should be noted that, the first correspondence table or the second correspondence table may be stored in the memory 62.

The image-shooting apparatus of this embodiment uses the average value of the picture size calculated according to the storage space occupied by the pictures shot before the current shooting in the current shooting mode and the number of the pictures shot before the current shooting in the current shooting mode to replace a preset size of space required by each picture in the shooting mode in the image-shooting apparatus in the prior art, and the average value of the picture size may vary with a change in the number of the shot pictures, which can reflect in real time the size of the space required by the picture in the current shooting mode, so that the determined number of available shots is more realistic, and precision of the determined number of available shots is improved.

Further, when the initial value of the picture size is preset only once, the image-shooting apparatus of this embodiment uses the average value of the picture size calculated according to the storage space occupied by the pictures shot before the current shooting in the current shooting mode and the number of the pictures shot before the current shooting in the current shooting mode to replace the preset size of the space required by each picture in the shooting mode in the image-shooting apparatus in the prior art, so that there is no need to preset the size of the space required by each picture in each shooting mode, which solves the problem that the size of the space required by each picture in each shooting mode needs to be preset in the image-shooting apparatus in order to determine the number of available shots, thereby solving the problems, such as complex operations and low efficiency, caused by presetting of the size of the space required by each picture.

Further, optionally, the image-shooting apparatus of this embodiment uses the average value of the picture size calculated according to the storage space occupied by the pictures shot before the current shooting in the current shooting mode and the number of the pictures shot before the current shooting in the current shooting mode as an estimated value of the space required by each picture, which fully considers some practical factors such as hardware and performance of the image-shooting apparatus, and the average value of the picture size may vary with a change in the number of the shot pictures, which is more accurate than an estimated value obtained using image parameters set in a shooting mode in the prior art, thereby improving precision of the determined number of available shots.

Through the description of the foregoing implementation manners, a person skilled in the art may clearly understand that the present invention can be implemented by hardware or firmware or a combination thereof. When the present invention is implemented by software, the above functions may be stored in a computer readable medium or transmitted as one or more instructions or code in the computer readable medium. The computer readable medium includes a computer storage medium and a communication medium, where the communication medium includes any medium capable of transferring computer programs from one place to another. The storage medium may be any available medium that a computer can access. The computer readable medium may include, for example but is not limited to, a RAM, a ROM, an EEPROM, a CD-ROM or other optical disc storage media, a magnetic disk storage media or other magnetic storage devices, or any other media capable of carrying or storing expected program code in the form of instructions or a data structure and capable of being accessed by a computer. Further, any connection can be appropriately used as a computer readable medium. For example, if the software implements transmission from websites, servers, or other remote sources by using a coaxial cable, an optical fiber cable, a twisted pair, a digital subscriber line (DSL) or wireless technologies such as infrared, radio and microwave technology, the coaxial cable, optical fiber cable, twisted pair, DSL or the wireless technologies such as infrared, radio and microwave technology are included in the definition of the medium. According to the present invention, the disk (Disk) and disc (disc) include compact disc (CD), laser disc, optical disc, digital versatile disc (DVD), floppy disk, and blue-ray disc, where the disk generally replicates data in a magnetic way, and the disc replicates data by using laser light in an optical way. The foregoing combination shall fall within the protection scope of the computer readable medium.

In view of the above, the foregoing descriptions are merely exemplary embodiments of the technical solutions of the present invention, but are not intended to limit the protection scope of the present invention. Any modification, equivalent replacement, or improvement made without departing from the spirit and principle of the present invention shall fall within the protection scope of the present invention.

What is claimed is:

1. A method for determining the number of available shots, comprising:
    determining a current shooting mode;
    acquiring an average value of a picture size before current shooting in the current shooting mode by
        acquiring, according to the current shooting mode, a first index value corresponding to the current shooting mode;
        determining whether the first index value exists in a first correspondence table, wherein the first correspondence table is used to store correspondence between the first index value and the average value of the picture size before the current shooting in the current shooting mode; and
        when a determination result is that the first index value exists in the first correspondence table, acquiring, from the first correspondence table, the average value of the picture size corresponding to the first index value; and
    determining, according to currently available storage space and the average value of the picture size before the current shooting in the current shooting mode, the number of available shots before the current shooting in the current shooting mode.

2. The method for determining the number of available shots according to claim 1, wherein before the determining whether the first index value exists in the first correspondence table, the method further comprises:
    calculating, the average value of the picture size before the current shooting in the current shooting mode; and
    updating, according to the average value of the picture size before the current shooting in the current shooting mode, the first correspondence table.

3. The method for determining the number of available shots according to claim 2, wherein the average value of the picture size is obtained according to a formula $V_{k-1} = (V_{k-2} * n_{k-2} + a)/n_{k-1}$, wherein
    $V_{k-1}$ represents the average value of the picture size before the current shooting in the current shooting mode;
    $V_{k-2}$ represents an average value of a picture size stored in the first correspondence table, before previous shooting of the current shooting in the current shooting mode;
    a represents storage space occupied by pictures shot in the previous shooting of the current shooting in the current shooting mode;
    $n_{k-1}$ represents the number of the pictures shot before the current shooting in the current shooting mode; and
    $n_{k-2}$ represents the number of pictures shot before the previous shooting of the current shooting in the current shooting mode.

4. A method for determining the number of available shots, comprising:
    determining a current shooting mode;
    acquiring an average value of a picture size before current shooting in the current shooting mode by,
        acquiring, according to the current shooting mode, a second index value corresponding to the current shooting mode;
        determining whether the second index value exists in a second correspondence table, wherein the second correspondence table is used to store correspondence between the second index value, the storage space occupied by the pictures shot before the current shooting in the current shooting mode, and the number of the pictures shot before the current shooting in the current shooting mode;
        when a determination result is that the second index value exists in the second correspondence table, acquiring, from the second correspondence table, the storage space occupied by the shot pictures and the number of the shot pictures that are corresponding to the second index value; and obtaining, according to the acquired storage space occupied by the shot pictures and the acquired number of the shot pictures, the average value of the picture size before the current shooting in the current shooting mode
    determining, according to currently available storage space and the average value of the picture size before the current shooting in the current shooting mode, the number of available shots before the current shooting in the current shooting mode.

5. The method for determining the number of available shots according to claim 4, wherein before the determining whether the second index value exists in a second correspondence table, the method further comprises:
    determining, the storage space occupied by the pictures shot before the current shooting in the current shooting mode;
    determining, the number of the pictures shot before the current shooting in the current shooting mode; and
    updating, according to the storage space occupied by the pictures shot before the current shooting in the current shooting mode and the number of the pictures shot before the current shooting in the current shooting mode, the second correspondence table.

6. The method for determining the number of available shots according to claim 5, wherein the storage space occupied by the pictures shot is determined according to a formula $M_{k-1} = M_{k-2} + a$; and the number of the pictures shot is determined according to a formula $n_{k-1} = n_{k-2} + b$; and
    wherein
    $M_{k-1}$ represents the storage space occupied by the pictures shot before the current shooting in the current shooting mode;
    $M_{k-2}$ represents storage space occupied by pictures stored in the second correspondence table, shot before previous shooting of the current shooting in the current shooting mode;
    a represents storage space occupied by pictures shot in the previous shooting of the current shooting in the current shooting mode;
    $n_{k-1}$ represents the number of the pictures shot before the current shooting in the current shooting mode;

$n_{k-2}$ represents the number of the pictures, stored in the second correspondence table, shot before the previous shooting of the current shooting in the current shooting mode; and b represents the number of the pictures shot before the previous shooting of the current shooting in the current shooting mode.

7. An image-shooting apparatus, comprising:

a mode determining module, configured to determine a current shooting mode;

an acquiring module, configured to acquire an average value of a picture size before current shooting in the current shooting mode; and a picture number determining module, configured to determine, according to currently available storage space and the average value of the picture size before the current shooting in the current shooting mode, the number of available shots before the current shooting in the current shooting mode;

wherein the acquiring module comprises:

a first acquiring unit, configured to acquire, according to the current shooting mode, a first index value corresponding to the current shooting mode; a first judging unit, configured to determine whether the first index value exists in a first correspondence table, wherein the first correspondence table is used to store correspondence between the first index value and the average value of the picture size before the current shooting in the current shooting mode; and a second acquiring unit, configured to, when a determination result of the first judging unit is that the first index value exists in the first correspondence table, acquire, from the first correspondence table, the average value of the picture size corresponding to the first index value.

8. The image-shooting apparatus according to claim 7, wherein the acquiring module further comprises:

a third acquiring unit, configured to calculate, the average value of the picture size before the current shooting in the current shooting mode; and a first updating unit, configured to update, according to the average value of the picture size before the current shooting in the current shooting mode, the first correspondence table.

9. The image-shooting apparatus according to claim 8, wherein the third acquiring unit is further configured to obtain the average value of the picture size according to a formula $V_{k-1}=(V_{k-2}*n_{k-2}+a)/n_{k-1}$, wherein $V_{k-1}$ represents the average value of the picture size before the current shooting in the current shooting mode;

$V_{k-2}$ represents an average value of a picture size stored in the first correspondence table, before previous shooting of the current shooting in the current shooting mode;

a represents storage space occupied by pictures shot in the previous shooting of the current shooting in the current shooting mode;

$n_{k-1}$ represents the number of the pictures shot before the current shooting in the current shooting mode; and $n_{k-2}$ represents the number of pictures shot before the previous shooting of the current shooting in the current shooting mode.

10. An image-shooting apparatus, comprising:

a mode determining module, configured to determine a current shooting mode;

an acquiring module, configured to acquire an average value of a picture size before current shooting in the current shooting mode; and picture number determining module, configured to determine, according to currently available storage space and the average value of the picture size before the current shooting in the current shooting mode, the number of available shots before the current shooting in the current shooting mode;

wherein the acquiring module comprises:

a fourth acquiring unit, configured to acquire, according to the current shooting mode, a second index value corresponding to the current shooting mode;

a second judging unit, configured to determine whether the second index value exists in a second correspondence table, wherein the second correspondence table is used to store correspondence between the second index value, the storage space occupied by the pictures shot before the current shooting in the current shooting mode, and the number of the pictures shot before the current shooting in the current shooting mode;

a fifth acquiring unit, configured to, when a determination result of the second judging unit is that the second index value exists in the second correspondence table, acquire, from the second correspondence table, the storage space occupied by the shot pictures and the number of the shot pictures that are corresponding to the second index value; and a sixth acquiring unit, configured to obtain, according to the storage space occupied by the shot pictures acquired by the fifth acquiring unit and the number of the shot pictures acquired by the fifth acquiring unit, the average value of the picture size before the current shooting in the current shooting mode.

11. The image-shooting apparatus according to claim 10, wherein the acquiring module further comprises:

a seventh acquiring unit, configured to determine, the storage space occupied by the pictures shot before the current shooting in the current shooting mode;

an eighth acquiring unit, configured to determine, the number of the pictures shot before the current shooting in the current shooting mode; and a second updating unit, configured to update, according to the storage space occupied by the pictures shot before the current shooting in the current shooting mode and the number of the pictures shot before the current shooting in the current shooting mode, the second correspondence table.

12. The image-shooting apparatus according to claim 11, wherein the seventh acquiring unit is further configured to obtain the storage space occupied by the pictures shot according to a formula $M_{k-1}=M_{k-2}+a$; the eighth acquiring unit is further configured to determine the number of the pictures shot according to a formula $n_{k-1}=n_{k-2}+b$; and wherein $M_{k-1}$ represents the storage space occupied by the pictures shot before the current shooting in the current shooting mode;

$M_{k-2}$ represents storage space occupied by pictures, stored in the second correspondence table, shot before previous shooting of the current shooting in the current shooting mode;

a represents storage space occupied by pictures shot in the previous shooting of the current shooting in the current shooting mode;

$n_{k-1}$ represents the number of the pictures shot before the current shooting in the current shooting mode;

$n_{k-2}$ represents the number of the pictures, stored in the second correspondence table, shot before the previous shooting of the current shooting in the current shooting mode; and b represents the number of the pictures shot before the previous shooting of the current shooting in the current shooting mode.

* * * * *